United States Patent

Harvey

[11] Patent Number: 6,146,299
[45] Date of Patent: Nov. 14, 2000

[54] SPLIT DRIVE SPROCKET FOR A CONVEYOR BELT

[75] Inventor: John Harvey, Hortonville, Wis.

[73] Assignee: KVP Falcon Plastic Belting, Inc., Rancho Cordova, Calif.

[21] Appl. No.: 09/280,303

[22] Filed: Mar. 29, 1999

[51] Int. Cl.[7] .............................. F16H 55/12; F16H 55/46
[52] U.S. Cl. .................................................................. 474/95
[58] Field of Search ............................... 474/95, 152, 161

[56] References Cited

U.S. PATENT DOCUMENTS

| | | | |
|---|---|---|---|
| 1,391,719 | 9/1921 | Conyngham | 474/95 |
| 5,037,356 | 8/1991 | Gladczak et al. | |
| 5,295,917 | 3/1994 | Hannum | 474/95 |
| 5,316,522 | 5/1994 | Carbone | |
| 5,810,686 | 9/1998 | de Jong et al. | 474/161 |

*Primary Examiner*—Dirk Wright
*Attorney, Agent, or Firm*—Thomas M. Freiburger

[57] ABSTRACT

A sprocket of the type typically used for driving a plastic conveyor belt is split through the drive shaft hole at its center, so that the sprocket can be assembled over a drive shaft without disrupting the conveyor assembly. Two sections which form the drive shaft preferably are identical, and may be machined from high molecular weight polyethylene. In a preferred embodiment the two sections are assembled together by interlocking features shaped as jigsaw puzzle pieces. The two sections are placed against the drive shaft and are moved together in the axial direction of the drive shaft, thus sliding the sections together. One or more fasteners may be provided at easily accessed locations to permit the two sections from sliding apart.

9 Claims, 2 Drawing Sheets

SPLIT DRIVE SPROCKET FOR A CONVEYOR BELT

BACKGROUND OF THE INVENTION

The invention is concerned with drive sprockets for conveyor belts. In particular the invention concerns a split drive sprocket comprised of two sections, easily assembled on a drive shaft without dismantling of the conveyor belt.

Split conveyor drive sprockets are known, including those designed for modular plastic conveyor belts. For example, see U.S. Pat. No. 5,037,356, showing a two-section split sprocket having provision for receiving diagonally-inserted retention bolts.

Split drive sprockets previous to this invention have required the assembly of retention bolts or screws in order to retain the two sections together, against radial separation. Besides being somewhat difficult in assembly, such split sprockets have generally been more complex and more expensively made than the present invention described below.

SUMMARY OF THE INVENTION

A split drive sprocket according to the invention, primarily for use with a modular plastic conveyor belt, is formed of two components or sprocket sections which fit together to form the complete drive sprocket; the manner in which the sprocket sections fit together is the important feature of the invention. The two sections, each of which may be machined of UHMW polyethylene for high strength, assemble by sliding them together along a path of movement which is parallel to the axis of a drive shaft for the sprocket.

The two sprocket sections each form a portion of a central hole, which may be shaped for positive drive engagement, such as a square. The two sprocket sections have interlocking means which provide for the slide-together assembly of the sections in such a manner that the sections are locked against radial separation, i.e. against pulling apart away from the shaft.

In a preferred embodiment the interlocking means comprises jigsaw puzzle-shaped protrusions and sockets on the sections, machined or otherwise shaped to fit together very closely and precisely. In a specific embodiment the two sections are substantially identical, each having a puzzle-piece-shaped protrusion extending from one side of the shaft position and a similarly shaped socket positioned on the opposite side of the shaft location. In this way the two sprocket sections can be manufactured identically.

The two sections can alternatively be different, such as with two jigsaw-shaped protrusions on one section and two complementarily shaped sockets on the other.

The sprocket is held together very securely against pulling apart once assembled. However, one or more fasteners preferably are included for security against relative lateral shifting of the two sections. These fasteners can be placed in virtually any position which will engage both sprocket sections; in one preferred embodiment a fastener path extends from the outer surface of one sprocket tooth in one section, adjacent to the split or seam, down through that portion of the one section, through the void of the puzzle-shaped socket of that section, and back into the plastic material, terminating short of the recess which forms the drive shaft opening. An aligned hole in the mating jigsaw puzzle-shaped protrusion of the other sprocket section forms an intermediate link in this path, such that when a fastener is placed down into the bore at the surface of the sprocket tooth, the fastener penetrates a portion of the one sprocket section then through the puzzle piece protrusion of the second sprocket section, and finally into the terminal bore portion of the first sprocket section. The fastener bore, or at least some portion of it, is threaded for engagement by a threaded fastener.

Although a single such fastener would be adequate to retain the two sections together against sliding apart axially, a second such bore and fastener path is included in a specific embodiment, at a position 180° opposite the first fastener location.

Fasteners may be placed in alternate locations and in different orientations, so as long at least one fastener is provided to prevent axial sliding-apart movement of the two assembled sections.

It is thus among the objects of the invention to improve the economy and convenience of use of split sprockets, particularly for modular plastic conveyor belts, by providing an axially sliding-together interlocking arrangement between two sprocket halves, the assembly being easily made over an existing drive shaft which is already in service in a conveyor belt assembly. These and other objects, advantages and features of the invention will be apparent from the following description of a preferred embodiment, considered along with the accompanying drawings.

DESCRIPTION OF THE PREFERRED EMBODIMENTS

Figure 1:
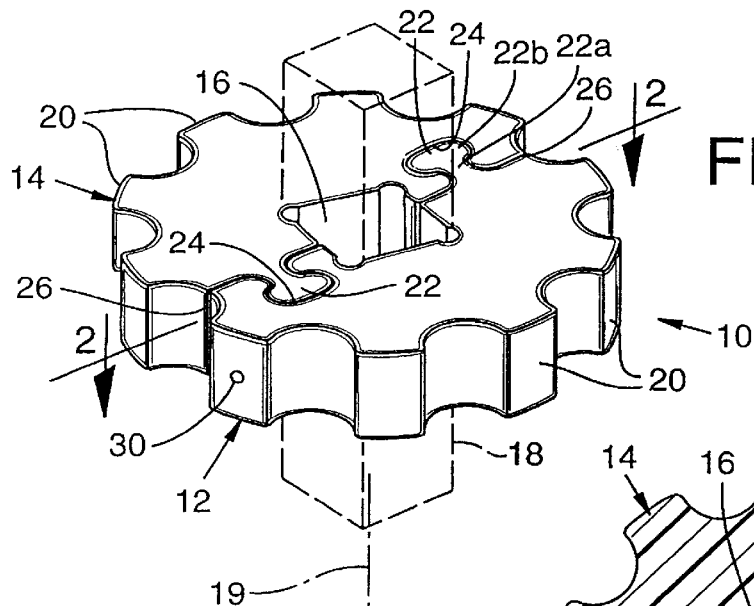
FIG. 1 is a perspective view showing a split sprocket assembly in accordance with the invention, with a drive shaft indicated in dashed lines.
Figure 2:
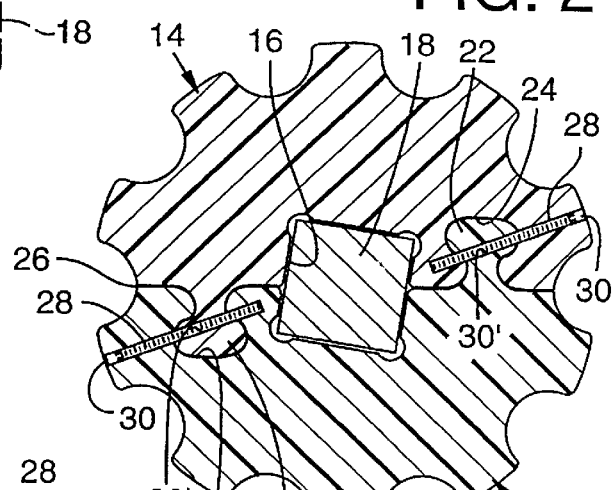
FIG. 2 is a sectional view through the assembled sprocket.
Figure 3:
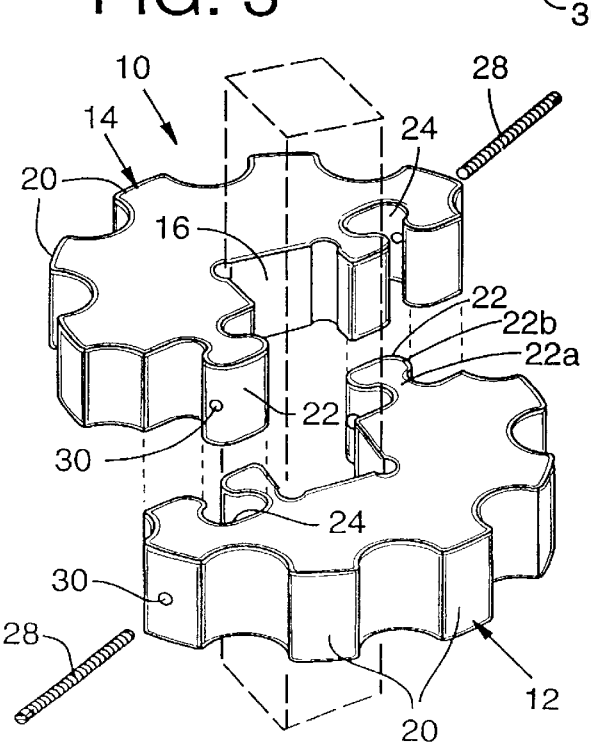
FIG. 3 is an exploded view showing the two sprocket sections and the manner of assembly.

FIG. 1 shows a sprocket 10 preferably formed of plastic material, such as UHMW polyethylene, machined or molded in two sections 12 and 14 as shown in all of FIGS. 1–3.

The two sections 12 and 14 in this embodiment are identical, or substantially identical and interchangeable. Each forms a portion of a center drive shaft opening 16 in which a drive shaft 18 is shown in dashed lines in FIG. 1, and each defines half of the sprocket teeth or driving elements 20 which extend radially outwardly in evenly spaced relationship at the periphery of the sprocket.

FIG. 3 shows the manner in which the two sprocket sections 12 and 14 slide together in an axial direction with respect to the drive shaft 18 and to the intended rotation of the completed sprocket 10. This sliding assembly involves fitting of jigsaw puzzle piece-shaped protrusions 22 on one section into complementarily shaped recesses or sockets 24 in the opposing section. In a preferred embodiment these puzzle-piece interlocking devices are very closely fitted, with extremely small tolerance, in the order of less than about 0.002 to 0.003 inch throughout the seam or split line 26 between the two assembled sections. The most reliable close tolerance between the assembled sections generally can be achieved by machining of a relatively hard plastic material such as UHMW polyethylene. The close tolerance makes the assembled sprocket 10 so solid, rigid and seemingly integral that it behaves as a unitary, integral component and is very ruggedly held together by the interlocking devices.

In the embodiment illustrated, the jigsaw puzzle-piece protrusion 22 has a narrow neck 22a leading to an enlarged head 22b, typical of a simple jigsaw puzzle piece. Other shapes could be used, so long as they lock the sections together against pulling apart, off the shaft. All surfaces of the split line 26, i.e. the face or seam between the adjoining sprocket components 12 and 14, preferably are substantially parallel to the rotational axis 19 of the sprocket 10. This enables the two components to be assembled together by sliding when the components are positioned over the drive shaft 18. Alternatively, these faces could be somewhat angled relative to the axis 19, such that the two sections are assembled by holding one section against the drive shaft while sliding the other together so as to converge the two sections over the shaft.

In one preferred embodiment, a sprocket 10 having a diameter of about 6¼ inches (between extremities of the teeth) has a thickness of about 1¼ inches. The drive shaft opening 16, if square as shown, may have a width of about 1½ inches.

The drive sprocket 10 in preferred embodiments as described is so closely held together that it acts as a rigid belt driving device, and cannot pull apart radially from the drive shaft. There is very little in the way of forces that would tend to slide the two sprocket components 12 and 14 apart in the axial direction. However, at least one fastener should be included to assure there is no relative axial shift of the two components. The fastener can be small in diameter, as it encounters only a very small load. In one form, such a fastener is shown at 28 in FIG. 2. The machine screw 28 is installed in a bore 30 in one of the sprocket sections 12, which may be placed as shown, in the outer surface of a sprocket tooth or driving element 20, the bore passing through the puzzle-piece socket 24 of the interlocking device and ending in a portion of the sprocket section beyond that of the puzzle piece socket, as shown in FIGS. 2 and 3. The bore 30 also passes through the puzzle-piece protrusion 22 of the opposing sprocket section 14 as shown. The bore 30, which may be (but not necessarily) generally radially directed, is threaded at least in some portion, such as in the protrusion 22 and beyond, so that the fastener 28 can be held tightly in place and prevented from backing out. Preferably the machine screw 28 is a headless machine screw, with a screwdriver slot or an allen wrench socket, so it can be installed so as to lie below the surface of the sprocket driving element 20.

Two such fasteners, or at least two threaded bores to receive such fasteners, are preferable for the embodiment of FIGS. 1–3, because the two sections 12 and 14 can be manufactured identical. The fastener bore could alternatively be directly on the seam 26, with one side of the threaded bore formed by one section 12 and the other side formed by the other section 14.

Figure 4:
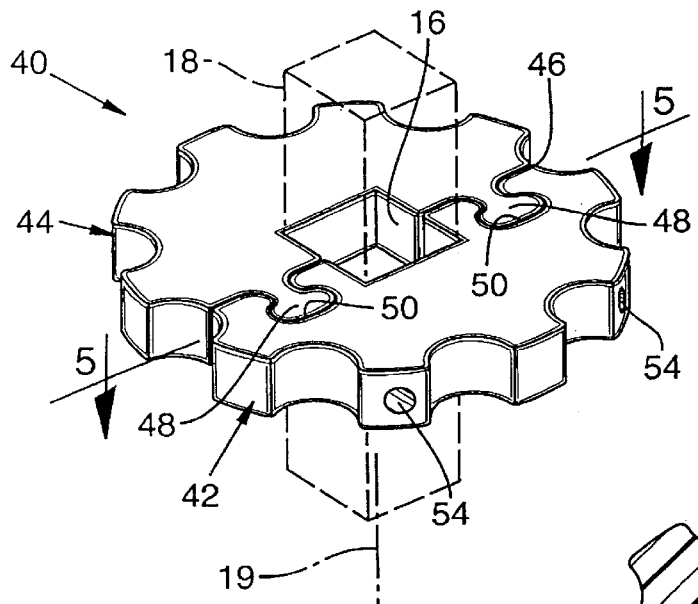
FIGS. 4, 5 and 6 are similar to FIGS. 1–3, but somewhat modified form of the invention.
Figure 5:
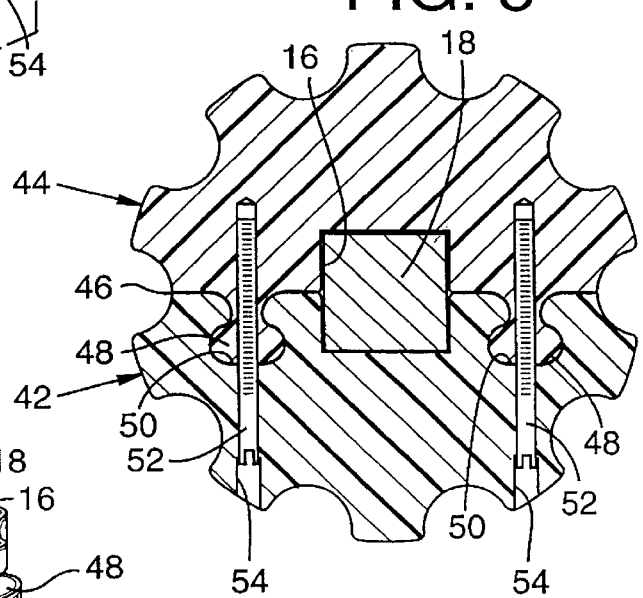
Figure 6:
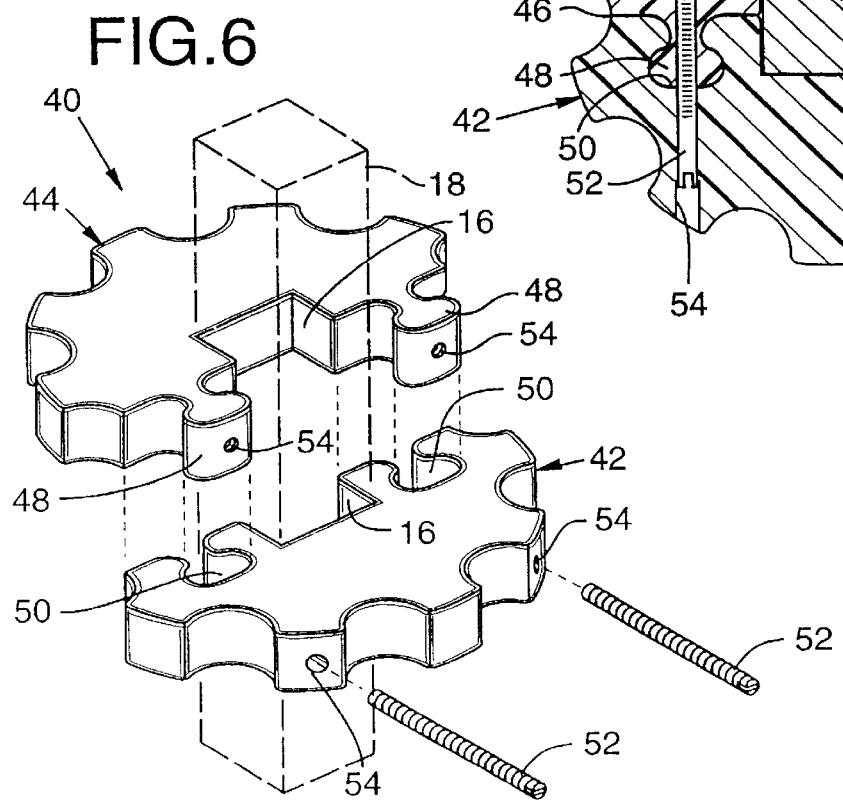

FIGS. 4, 5 and 6 show an example of another embodiment of a split sprocket according to the invention. In the sprocket 40, mating sprocket sections 42 and 44 are joined together along a seam or split line 46. While the jigsaw puzzle-shaped protrusions 48 may be similar in shape to those described above, in this form of the sprocket configuration both protrusions 48 are extending from the same sprocket section 44. The sprocket section 42 thus has two sockets 50, one on either side of the central shaft opening 16, for precisely mating with the two protrusions 48.

The embodiment of drive sprocket 40 shown in FIGS. 4–6 also illustrates an alternative fastener arrangement, although this could be applied to the earlier embodiment as well. A pair of machine screws 52 are secured into bores 54 which enter the sprocket section 42 and extend into the other sprocket section 44 as shown. The arrangement of fasteners as illustrated allows both fasteners to be installed from one side of the sprocket and drive shaft. However, as mentioned above, a single fastener ordinarily can be sufficient to secure the two sprocket sections against relative sliding motion which would enable their removal from the shaft 18.

The above described preferred embodiments are intended to illustrate the principles of the invention, but not to limit its scope. Other embodiments and variations to this preferred embodiment will be apparent to those skilled in the art and may be made without departing from the spirit and scope of the invention.

I claim:

1. A split drive sprocket for a conveyor belt, comprising:

two plastic components comprising sprocket sections which fit together to form a complete drive sprocket which is generally circular and with peripheral driving elements on a periphery of each sprocket section configured to engage with and drive a conveyor belt as it passes over the drive sprocket, the two sprocket sections together defining a central hole in the sprocket for fitting onto a sprocket drive shaft located essentially on a central axis of the sprocket, the hole being partially formed by one sprocket section and partially formed by the other, interlocking means on the two sprocket sections and cooperative between the two sprocket sections for assembling the two sections by sliding the two sections together in a direction of relative movement which is parallel to the central axis of the complete drive sprocket, said interlocking means comprising a protrusion on one sprocket section, extending toward the other, and a complementarily shaped socket on the other sprocket section, positioned and configured to receive the protrusion in sliding and interlocking engagement and shaped such that the two sprocket sections can be assembled and separated only by such axial-direction sliding movement and are prevented from separating by pulling radially away from the axis, and a bore extending inwardly from the periphery of one sprocket section, the bore being formed partly by the one sprocket section and partly by the other, the bore being at least partially threaded in the complete drive sprocket, and a retention screw assembled in the bore and extending inwardly from the periphery of the one sprocket section and into the other sprocket section for preventing separation of the sprocket sections by relative sliding movement parallel to said axis.

2. The split drive sprocket of claim 1, wherein the interlocking means includes one said protrusion and one said socket on each sprocket section.

3. The split drive sprocket of claim 2, where the two sprocket sections are substantially identical and interchangeable such that a plurality of sprocket sections in only one configuration can be produced to assemble a plurality of sprockets.

4. The split drive sprocket of claim 3, wherein the protrusion of the interlocking means is shaped generally as a jigsaw puzzle piece, with a narrow neck extending toward the opposite sprocket section and an enlarged head at the extremity of the narrow neck.

5. The split drive sprocket of claim 1, wherein the protrusion of the interlocking means is shaped generally as a jigsaw puzzle piece, with a narrow neck extending toward the opposite sprocket section and an enlarged head at the extremity of the narrow neck.

6. The split drive sprocket of claim 1, wherein the bore extends generally radially from one of the driving elements of the one sprocket section and into a protrusion of the other sprocket section.

7. The split drive sprocket of claim 1, wherein each protrusion is generally mushroom-shaped as the sprocket is viewed flatly, including an enlarged head and a narrow neck.

8. The split drive sprocket of claim 1, wherein the sprocket sections are formed of UHMW polyethylene.

9. The split drive sprocket of claim 1, wherein the two sprocket sections together define a square opening as said central hole, for fitting onto a square drive shaft.

* * * * *